Oct. 3, 1950  V. G. KLEIN  2,524,129
VALVE
Filed March 7, 1945
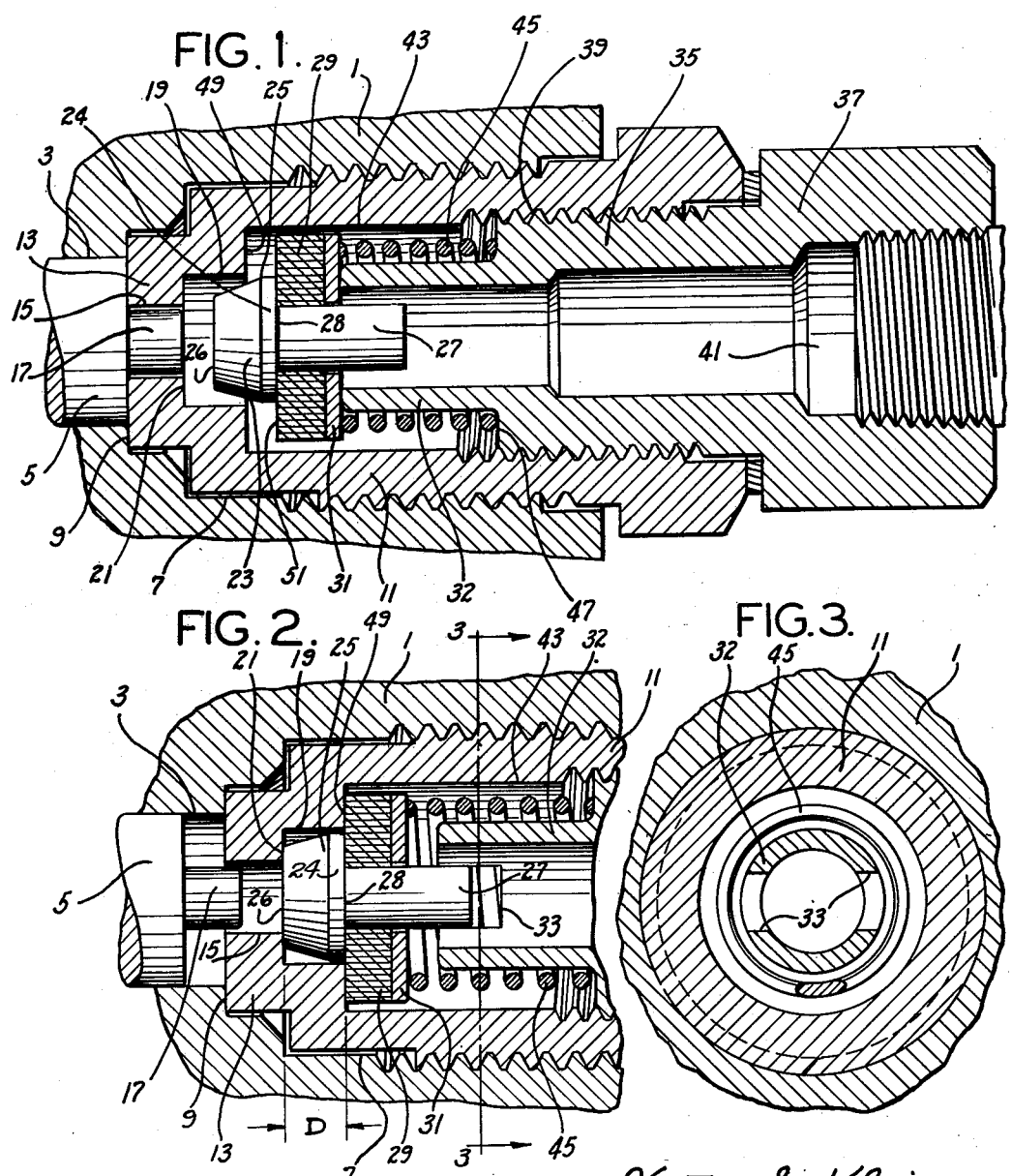

Patented Oct. 3, 1950

2,524,129

UNITED STATES PATENT OFFICE 2,524,129

VALVE

Victor G. Klein, St. Louis, Mo., assignor to Lincoln Engineering Company, St. Louis, Mo., a corporation of Missouri Application March 7, 1945, Serial No. 581,509

6 Claims. (Cl. 251—144)

This invention relates to valves, and with regard to certain more specific features, to check valves for controlling flow of gases and liquids in the same unit.

Among the several objects of the invention may be noted the provision of a check valve which will effectively check against flow of both liquid and gaseous substances in the same unit; the provision of a valve of the class described which employs rigid sealing means for holding against high-pressure liquid flow and resilient sealing means for holding against gaseous flow; the prosion of a valve of the class described in which is employed an arrangement for preserving the resilient sealing means against destruction under the high pressures associated with the control of the liquid material; and the provision of a valve of this class which is easy to assemble and disassemble for replacement of parts. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section showing the valve in opened position;

Fig. 2 is a fragmentary view similar to Fig. 1 but showing the valve in closed position; and, Fig. 3 is a vertical section taken on line 3—3 of Fig. 2.

Similar reference characters indicate corresponding parts throughout the several views of the drawings.

The present valve is particularly adapted for controlling flow of lubricants and the like which may be placed under high pressures by high-speed, short-stroke pumps, although the invention has other applications as well. Check valves for such pumps can ordinarily be made effective to check against lubricant flow by employing rigid (metal) sealing means. However, such rigid sealing means are not entirely satisfactory for checking flow of gases. Hence at the beginning of pumping operations when the pump cylinders are empty of liquids, they easily become air bound and lose their primes.

It has been suggested to use in addition to the rigid sealing means auxiliary resilient sealing means for checking against flow of gases, thus to prevent such pumps from losing their primes under starting conditions. One difficulty in the case of such additional resilient sealing means is their tendency to destruction under the high pressure that is subsequently engendered by the pump in pumping the liquid. The present invention entirely overcomes the stated difficulties.

Referring now more particularly to Fig. 1, there is shown at numeral 1 a pump having a cylinder 3 in which is a reciprocating pump plunger 5. In the housing 1 is a threaded, counterbore 7 which provides a seat 9 at the end of the piston 5 in its ultimate position. Threaded into the counterbore 7 is a hollow bushing 11 having a base 13 which is screwed up against said seat 9. In the base is an opening 15 which accommodates a cylindric extension 17 from the piston 5. The purpose of the extension 17 is to displace fluid from the opening 15 at the end of the stroke of the piston 5, thus reducing the clearance volume and reducing the amount of air, upon starting the pump, which otherwise would re-expand into the cylinder 3 and reduce the priming efficiency. Obviously, the clearance volume could also be made small by reducing the opening 15 to a minimum and omitting the extension 17.

Beyond the opening 15 is a counterbore forming a pocket 19. The bottom 21 of this pocket 19 forms a seat for the conical head 23 of a valve 25.

The outside portion of the valve 25 is cylindric for a short distance as shown at 24, and a portion 23 tapers forwardly, which at its front end is truncated at 26 for seating on the seat 21. This allows for free flow from the inlet 15 when the valve is open (Fig. 1), despite the fact that the cylindric portion 24 of the valve closely fits into the pocket 19 when the valve is closed (Fig. 2). If desired, the sides of pocket 19 could be tapered to act as a seat for the tapered portion 23, in which event the seat at 21 would be unnecessary.

In the form shown, the diameter at the truncation 26 is such as to form a narrow contact area on the seat 21 when the valve is closed. The outside diameter of the narrow cylindric part 24 fits closely within the pocket 19, only a minimum clearance being employed.

Extending rearward from the valve is a stem 27, around which snugly fits an auxiliary, flat, resilient valve disc 29. This disc seats flatly on the flat back 28 of valve 25. Behind the disc 29 is a washer 31 which, when the valve is opened, seats on the crenelated end of a tubular member 32. The crenelations are shown at 33. They form fluid passages. The tubular member 32 forms an extension from a larger threaded portion 35 of an outlet bushing 37 which is threaded into the bushing 11, as indicated at 39. The bushing 37 forms an outlet 41. The tubular portion 32 is substantially spaced from a large cup-shaped counterbore 43 in the bushing 11. This space accommodates a compression spring 45 which reacts from a shoulder 47 at one end, and against the washer 31 at the other end.

A function of the washer 31 is to distribute the pressure of the spring 45 throughout the entire rear space of the resilient disc 29, and also the back pressure on 29 when the valve is closed. The end of tubular member 32 functions as a stop to limit movement of the valve and to prevent full compression of spring 45. It will be noted that, if no such stop were provided, the spring might be fully compressed by the valve and its convolutions might engage each other and close off crenelations 33 from the inlet, in which event little or no fluid would flow through the valve. As shown in Fig. 1, the stop insures that there will be spaces between the convolutions of the spring.

The dimension D is about the same for the axial depth of the valve head 25 as it is for the depth of the recess 19 for accommodating that head when seated or closed. Thus the flat back 28 of the head and the flat bottom 49 of the counterbore 43 are practically coplanar when closed (Fig. 2). Thus when the valve is closed the flat forward face 51 of the resilient packing disc 29 is fully supported, and that is the reason for the small peripheral clearance between the cylindric part 24 of the valve and the adjacent flat bottom 49.

It may be observed that although it is preferable, as described, that the back 28 of the valve and the bottom 49 be flat and coplanar for supporting the flat front face of the disc 29, a fairly equivalent support may otherwise be formed; for example, the rear face of 24 and the bottom 49 may both be made conical, with the front face of the disc 29 made conical to fit both. It is believed, however, that the flat form shown for faces 28, 51 and 49 is preferable in minimizing undue deformation and cutting of the resilient ring 29. In any event, the radial clearance between the back 28 and the face 49 should be small enough that the disc 29 is not squeezed into it to such a degree as to be damaged. It may be added that the flat type of resilient disc 29 is easiest to make or obtain.

Operation is as follows:

When the pump plunger 5 is in its extreme outward (right-hand) position, the resulting flow forces out the valve, unseating both the rigid head 23, 25 and the resilient disc 29 and compressing the spring 45. The extent of the valve opening is limited by contact of the washer 31 with the end of the tube 32. Under such conditions fluid may flow out of the opening 15, passing into the tube 32 through the crenelations 33. At this time the extension 17 fills the space 15.

When the piston 5 retracts, as shown in Fig. 2, a partial vacuum is created in the cylinder 3 and in the space 15, the latter being caused by withdrawal of the extension 17. Hence the valve seats under action of the spring 45. This causes surface 26 to seat on surface 21. It also causes the resilient disc 29 simultaneously to seat its face 51 on coplanar surfaces 28 and 49. Thus there is a double support for the disc 29. Back pressure of material in the outlet 41 causes the seating with the help of spring 45. The seating at the rigid surfaces 21, 26 effects the primary seal against return liquid flow. If, as during a starting operation, air is being pumped, it is the seal effected by the resilient disc 29 on surfaces 28 and 49 which is the primarily effective one, since the rigid seal between 23 and 21 is not enough ordinarily to hold against a gas. No air leakage occurs between surfaces 28 and 51, nor between surfaces 51 and 49. Since the surfaces 28, 51 and 49 are interfitting, the disc 29 is evenly supported and is not subject to damaging deformations, particularly inasmuch as the radial clearance is small between 24 and 19.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A check valve comprising a member having an inlet, a first untapered pocket forming a first step adjacent said inlet, and a second and larger pocket forming a second step adjacent the first pocket, a reciprocating valve comprising a head formed with a forwardly tapering and truncated portion having its small end engageable with said first step and an untapered portion having a flat rear face, a valve stem extending rearwardly from said flat face, a flat resilient disc surrounding said stem and having a flat front face engaging the flat rear face of said head, said flat front face being engageable with said second step when said end of the head is engageable with the first step, the plane of said second step and the flat rear face of the head being coplanar when the valve is closed, the untapered portion of said head closely fitting said first pocket.

2. A check valve comprising a member having an inlet, a first cylindric pocket forming a first step adjacent said inlet, and a second and larger pocket forming a second step adjacent the first pocket, a reciprocating valve comprising a head formed with a forwardly tapering and truncated portion having its small end engageable with said first step and a cylindric portion having a flat rear face, the cylindric portion of the head closely fitting the first pocket, a valve stem extending rearwardly from said flat face, a flat resilient disc surrounding said stem and having a flat front face engaging the flat rear face of said head, said flat front face being engageable with said second step when said end of the head is engageable with the first step, the plane of said second step and said flat rear valve face being coplanar when the valve is closed.

3. A check valve comprising a member having an inlet, a first cylindric pocket forming a first step adjacent said inlet, and a second and larger pocket forming a second step adjacent the first pocket, a reciprocating valve comprising a head formed with a forwardly tapering and truncated portion having its small end engageable with said first step and a cylindric portion having a flat rear face, the cylindric portion of the head closely fitting the first pocket, a valve stem extending rearwardly from said flat face, a flat resilient disc surrounding said stem and having a flat front face engaging the flat rear face of said head, said flat front face being engageable with said second step when said end of the head is engageable with the first step, the plane of said second step and said flat rear valve face being coplanar when the valve is closed, and a washer surrounding said stem and engaging the other face of said disc.

4. A check valve comprising a hollow bushing having a cylindrical pocket in one end thereof of a diameter less than the internal diameter of said bushing, and an inlet in said end of smaller diameter than said pocket, providing a first flat valve seating surface surrounding said inlet and a second flat valve seating surface spaced from said first surface and surrounding said pocket, a reciprocating valve in said bushing comprising a head formed with a cylindrical portion adapted to fit closely, with small clearance, in said cylindrical pocket and a portion tapering from said cylindrical portion toward said inlet and having a flat end surface adapted to engage said first flat valve seating surface, said cylindrical portion of said head having a flat end face, a valve stem extending from said flat end face, a flat resilient disc of diameter larger than said pocket surrounding said stem and having a flat front face engaging the flat end face of said cylindrical portion of said head, the flat front face of said resilient disc being engageable with said second flat valve seating surface when said flat end surface of the tapered portion of said head engages said first flat valve seating surface, the plane of said second flat valve seating surface and the flat end face of the cylindrical portion of the head being coplanar when the valve is closed.

5. A check valve comprising a hollow bushing having a cylindrical pocket in one end thereof of a diameter less than the internal diameter of said bushing, and an inlet in said end of smaller diameter than said pocket, providing a first flat valve seating surface surrounding said inlet and a second flat valve seating surface spaced from said first surface and surrounding said pocket, a reciprocating valve in said bushing comprising a head formed with a cylindrical portion adapted to fit closely, with small clearance, in said cylindrical pocket and a portion tapering from said cylindrical portion toward said inlet and having a flat end surface adapted to engage said first flat valve seating surface, said cylindrical portion of said head having a flat end face, a valve stem extending from said flat end face, a flat resilient disc of diameter larger than said pocket surrounding said stem and having a flat front face engaging the flat end face of said cylindrical portion of said head, the flat front face of said resilient disc being engageable with said second flat valve seating surface when said flat end surface of the tapered portion of said head engages said first flat valve seating surface, the plane of said second flat valve seating surface and the flat end face of the cylindrical portion of the head being coplanar when the valve is closed, a washer surrounding said stem and engaging the other face of said disc, and a spring engaging said washer biasing said head and said resilient disc into engagement with their respective valve seating surfaces.

6. A check valve comprising a hollow cylindrical valve body having an end wall, said end wall being centrally provided with an inlet aperture and a pocket forming a first step surrounding said aperture and a second step spaced from said first step surrounding said pocket, a reciprocating valve in said body comprising a rigid valve head adapted to move in said pocket and seat against said first step and a resilient disc adapted to seat against said second step when said rigid head seats against said first step, a bushing forming a valve outlet secured in the other end of said valve body and having a tubular extension of reduced diameter extending toward said end wall of said body, thereby providing a shoulder, said extension having at least one aperture therein, a coil compression spring surrounding said tubular extension with its ends disposed against said shoulder and said valve, the end of said extension forming a stop for limiting movement of said valve in the other direction to prevent full compression and closure of the convolutions of said spring.

VICTOR G. KLEIN.

REFERENCES CITED

The following references are of record in the file of this patent:

UNITED STATES PATENTS

| Number | Name | Date |
|---|---|---|
| 65,791 | Burnett | June 18, 1867 |
| 152,179 | Shaw | June 16, 1874 |
| 851,182 | Rowbotham | Apr. 23, 1907 |
| 1,140,377 | Johnson | May 25, 1915 |
| 1,705,293 | Horthy | Mar. 12, 1929 |
| 1,785,259 | Hickerson | Dec. 16, 1930 |
| 2,163,472 | Shimer | June 20, 1939 |
| 2,329,087 | Russell | Sept. 7, 1943 |

FOREIGN PATENTS

| Number | Country | Date |
|---|---|---|
| 548,184 | France | Oct. 13, 1922 |
| 591,449 | France | Apr. 9, 1925 |